United States Patent
Rule et al.

(10) Patent No.: US 11,306,431 B2
(45) Date of Patent: Apr. 19, 2022

(54) ARTICLES INCLUDING MICROCAPSULES FOR ON-DEMAND ADHESION AND METHODS OF MAKING SAME

(71) Applicant: 3M INNOVATIVE PROPERTIES COMPANY, St. Paul, MN (US)

(72) Inventors: Joseph D. Rule, Woodbury, MN (US); Mary M. Caruso Dailey, Maplewood, MN (US); Anne N. De Rovere, Woodbury, MN (US); Lili Qie, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 35 days.

(21) Appl. No.: 15/100,655

(22) PCT Filed: Nov. 24, 2014

(86) PCT No.: PCT/US2014/067057
§ 371 (c)(1),
(2) Date: Jun. 1, 2016

(87) PCT Pub. No.: WO2015/088753
PCT Pub. Date: Jun. 18, 2015

(65) Prior Publication Data
US 2016/0305063 A1    Oct. 20, 2016

Related U.S. Application Data

(60) Provisional application No. 61/915,631, filed on Dec. 13, 2013.

(51) Int. Cl.
*D06M 23/12* (2006.01)
*B01J 13/16* (2006.01)
(Continued)

(52) U.S. Cl.
CPC ............ *D06M 23/12* (2013.01); *B01J 13/16* (2013.01); *C08J 9/365* (2013.01); *C09D 133/02* (2013.01);
(Continued)

(58) Field of Classification Search
CPC ... C08J 9/365; C08K 9/10; B32B 7/12; B32B 15/04; B32B 3/26; B32B 3/24;
(Continued)

(56) References Cited

U.S. PATENT DOCUMENTS 3,893,932 A * 7/1975 Azar .................. G03G 9/08755
430/109.4
4,103,053 A * 7/1978 Barehas ................ B44C 1/1733
156/219
(Continued)

FOREIGN PATENT DOCUMENTS

DE    2460855    6/1976
GB    1387241    3/1975
(Continued)

OTHER PUBLICATIONS

Encyclopaedia Britannica, "Specific Gravity," https://www.britannica.com/science/specific-gravity (Britannica). (Year: 2018).*
(Continued)

*Primary Examiner* — Lynda Salvatore
(74) *Attorney, Agent, or Firm* — Adrian L. Pishko (57) ABSTRACT

Articles are provided, including a substrate having a first major surface, the substrate including a nonwoven material, a woven material, or a foam. The article further includes microcapsules having an outer surface and a plasticizer encapsulated in the microcapsules, where the plurality of microcapsules is attached to the first major surface of the substrate with a polymeric material. A method of making an article is also provided, including providing a substrate
(Continued)

having a first major surface and providing microcapsules having an outer surface and a plasticizer encapsulated in the microcapsules. The method further includes attaching the microcapsules to the first major surface of the substrate with a polymeric material, thereby forming a polymeric matrix attached to the first major surface of the substrate.

19 Claims, 1 Drawing Sheet (51) Int. Cl.
  *C08J 9/36* (2006.01)
  *C09D 133/02* (2006.01)
  *C08K 9/10* (2006.01)
(52) U.S. Cl.
  CPC ............ *C08J 2375/04* (2013.01); *C08K 9/10* (2013.01); *C08K 2201/013* (2013.01)
(58) Field of Classification Search
  CPC ......... B32B 3/30; B32B 5/18; B65D 51/2821; Y10S 425/804; Y10T 428/1405; Y10T 428/2984; Y10T 428/2985
  USPC ....... 428/343, 119, 138, 161, 172, 204, 207, 428/321.3, 313, 86, 914; 442/227, 38
  See application file for complete search history.

(56) References Cited

U.S. PATENT DOCUMENTS

| | | | |
|---|---|---|---|
| 4,855,170 | A | 8/1989 | Darvell |
| 5,167,765 | A | 12/1992 | Nielsen |
| 5,292,622 | A * | 3/1994 | Metzger ................... G03F 7/28 430/252 |
| 5,821,293 | A | 10/1998 | Roesch |
| 6,075,072 | A | 6/2000 | Guilbert |
| 6,096,684 | A * | 8/2000 | Sasaki ..................... C08J 5/18 428/212 |
| 6,375,872 | B1 | 4/2002 | Chao |
| 6,624,273 | B1 * | 9/2003 | Everaerts ............... C09J 131/02 526/317.1 |
| 2002/0169233 | A1 * | 11/2002 | Schwantes ............. B01J 13/04 523/200 |
| 2005/0158540 | A1 * | 7/2005 | Sakai ......................... C09J 9/00 428/349 |
| 2006/0286374 | A1 * | 12/2006 | Sakai ................... B65H 37/007 428/343 |
| 2008/0038976 | A1 | 2/2008 | Berrigan |
| 2010/0104836 | A1 * | 4/2010 | Kobayashi ............. B43M 11/06 428/211.1 |
| 2011/0039980 | A1 | 2/2011 | Caruso |

FOREIGN PATENT DOCUMENTS

| | | |
|---|---|---|
| GB | 1426796 | 3/1976 |
| JP | 63-72532 | 4/1988 |
| JP | H7-3239 | 1/1995 |
| JP | 9-241598 | 9/1997 |
| JP | 2002-121533 | 4/2002 |
| JP | 2002-540245 | 11/2002 |
| JP | 2004-059804 | 2/2004 |
| JP | 2010-077569 | 4/2010 |
| JP | 2012-158039 | 8/2012 |
| WO | WO 1992-16290 | 10/1992 |
| WO | WO 2000/56830 | 9/2000 |
| WO | WO 2008/129749 | 10/2008 |

OTHER PUBLICATIONS

Abderrahmen, "Industrial Pressure Sensitive Adhesives Suitable for Physicochemical Microencapsulation", International Journal of Adhesion and Adhesives, 2011, vol. 31, pp. 629-633.

Aran-Ais, "Developments in Microencapsulation Technology to Improve Adhesive Formulations", The Journal of Adhesion, 2012, vol. 88, pp. 391-405.

Empereur, "Silicone Liner-Free Pressure-Sensitive Adhesive Labels", Macromolecular Materials and Engineering, 2008, vol. 293, pp. 167-172.

Fox, "Effect of Light Scattering upon the Apparent Refractive Index of Dispersed Polymers", American Physical Society, Jan. 30, 1956, vol. 1, No. 1, pp. 123.

Satas, The Handbook of Pressure Sensitive Adhesive Technology, 172-173 (1989).

International Search Report for PCT International Application No. PCT/US2014/067057 dated Mar. 26, 2015, 4 pages.

* cited by examiner

ARTICLES INCLUDING MICROCAPSULES FOR ON-DEMAND ADHESION AND METHODS OF MAKING SAME

CROSS REFERENCE TO RELATED APPLICATIONS

This application is a national stage filing under 35 U.S.C. 371 of PCT/US2014/067057, filed Nov. 24, 2014, which claims the benefit of U.S. Application No. 61/915,631, filed Dec. 13, 2013, the disclosure of which is incorporated by reference in its/their entirety herein.

FIELD

Articles are provided including microcapsules for on-demand adhesion, and methods of making the articles are provided.

BACKGROUND

Typically, the surfaces of pressure sensitive adhesives (PSAs) are protected by release liners or backsized backings to prevent them from sticking to undesired substrates before application. For some applications, it would be desirable to avoid the use of these liners and backings. For example, in some cases, the liners add significant cost to the product, but the liner is discarded before use of the adhesive, thus that cost is not adding direct value to the product and eliminating the liner could provide significant cost savings. In other cases, the use of a liner causes technical problems. For example, when the adhesive is on a delicate backing such as a nonwoven insulation material, the force required to remove the liner from the adhesive can damage the backing. For industrial applications, operators often have to wear gloves, which make removing the liner more difficult and/or time consuming, and the efficiency of the operation is reduced. Moreover, for some applications the location of the adhesive on the substrate is critical and needs to be well controlled. PSAs can be sprayed in various patterns that meet application requirements, but liner shapes/areas are more difficult to optimize, and often lead to covering the entire surface of the substrate with a liner, instead of just the adhesive area, which increases the cost.

Figure 1:
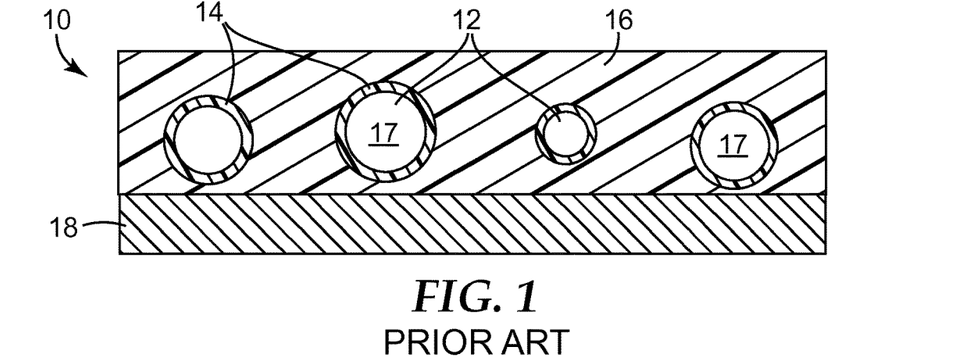
FIG. 1 is a cross-sectional schematic of a prior art article including microcapsules embedded in a pressure sensitive adhesive, which is disposed on a substrate.

The incorporation of plasticizer-containing microcapsules into a pressure sensitive adhesive has previously been described as including microcapsules completely contained within the thickness of the pressure sensitive adhesive layer. A cross-sectional schematic of such a general article is shown in FIG. 1. This type of construction has several disadvantages, however. First, the article 10 tends to require very high pressures to cause the triggering of adhesion. The microcapsules 12 rupture when the shell 14 of the microcapsule is strained beyond its failure point. When a capsule is completely embedded within a fluid-like matrix 16, as is the case with the prior art article of FIG. 1, pressure on the matrix tends to produce isostatic compression of the capsules. However, isostatic compression does not efficiently lead to deformation of the capsule, so high pressures are required to cause rupture of the capsules to release their contents 17. Such high pressures to activate adhesion may be impractical in certain applications, for instance applications in which the construction includes frangible and/or compressible substrate materials 18. Second, PSAs typically follow a time-temperature superposition principle, which generally means that the material can behave as a much softer material over long time scales than it appears to behave on short time scales. In the case of a microcapsule-containing PSA with the article depicted in FIG. 1, this property could cause the surface of the matrix 16 to build adhesion over extended periods of time even without the rupture of the microcapsules 12, which could lead to premature adhesion to undesired substrates. Hence, there remains a need for an article that can be caused to become tacky only when it is desired and without the need for a protective liner or high pressures to provide adhesion.

SUMMARY

Articles are provided including microcapsules for on-demand adhesion. In a first aspect, an article is provided that includes a substrate having a first major surface, the substrate comprising a nonwoven material, a woven material, or a foam. The article further includes a plurality of microcapsules comprising an outer surface and a plasticizer encapsulated in the microcapsules, where the plurality of microcapsules is attached to the first major surface of the substrate with a polymeric material.

In a second aspect, a method of making an article is provided. The method includes providing a substrate having a first major surface, the substrate comprising a nonwoven material, a woven material, or a foam, and providing a plurality of microcapsules comprising an outer surface and a plasticizer encapsulated in the microcapsules. The method further includes attaching the plurality of microcapsules to the first major surface of the substrate with a polymeric material, thereby forming a polymeric matrix attached to the first major surface of the substrate.

While the above-identified drawings, which may not be drawn to scale, set forth various embodiments of the present disclosure, other embodiments are also contemplated, as noted in the Detailed Description.

DETAILED DESCRIPTION

Articles and methods of providing adhesion to a substrate on demand are provided. More specifically, the article has a plurality of microcapsules containing a plasticizer attached to a substrate with a polymeric material. Upon rupturing of the microcapsules, the plasticizer softens the polymeric material and causes it to have adhesive properties, such as to become tacky.

The recitation of any numerical range by endpoints is meant to include the endpoints of the range, all numbers within the range, and any narrower range within the stated range (e.g. 1 to 5 includes 1, 1.5, 2, 2.75, 3, 3.8, 4, and 5). Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that, as used herein:

The term "a", "an", and "the" are used interchangeably with "at least one" to mean one or more of the elements being described.

The term "and/or" means either or both. For example, the expression "A and/or B" means A, B, or a combination of A and B.

The term "polymeric material" refers to a substance composed of at least one polymer.

The term "foam" refers to an open-cell polymeric material.

The term "microcapsule" refers to a polymeric material, which includes a frangible polymeric shell that confines the contents within the microcapsule until subjected to a force sufficient to fracture and fragment the shell (i.e., wall) material.

The term "(meth)acrylate" refers to both methacrylate and acrylate.

Figure 2:
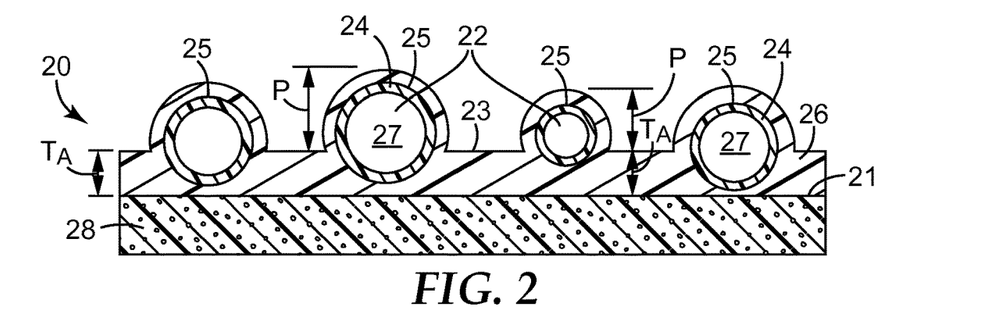
FIG. 2 is an exemplary cross-sectional schematic of an article including microcapsules attached to a substrate with a polymeric material.

In a first aspect, an article is provided. More particularly, an article is provided comprising a substrate having a first major surface, the substrate comprising a nonwoven material, a woven material, or a foam. The article further comprises a plurality of microcapsules comprising an outer surface and a plasticizer encapsulated in the microcapsules, where the plurality of microcapsules is attached to the first major surface of the substrate with a polymeric material. Referring to FIG. 2, an exemplary cross-sectional schematic is provided of such an article. The article 20 comprises a substrate 28 having a first major surface 21, and a plurality of microcapsules 22 are illustrated to be attached to the first major surface 21 of the substrate 28 with a polymeric material 26. In the embodiment of FIG. 2, the substrate 28 comprises a foam. Each microcapsule 22 comprises an outer surface 25, a plasticizer 27 disposed within the microcapsule 22, and a shell 24 that encloses the plasticizer 27. In the embodiment of FIG. 2, the polymeric material 26 has an average thickness $T_A$ covering the first major surface 21 of the substrate 28, and each of the plurality of microcapsules 22 comprises a portion that is located above the upper surface 23 of the coating of the polymeric material 26 on the first major surface 21 of the substrate 28. The distance between the upper surface 23 of the polymeric material 26 coating and the outer surface 25 at the top of each microcapsule 22 is referred to as "P" and is an indication of the extent of protrusion of each microcapsule 22 above the average polymeric material 26 coating thickness. The magnitude of P will vary depending on the precise diameter of each microcapsule 22. FIG. 2 also illustrates an embodiment in which the outer surface 25 of each microcapsule is completely coated with polymeric material 26. In certain embodiments, however, only a portion of the outer surface of the plurality of microcapsules will be covered with polymeric material.

In a second aspect a method is provided. More specifically, the method comprises providing a substrate having a first major surface and providing a plurality of microcapsules comprising an outer surface and a plasticizer encapsulated in the microcapsules. The substrate comprises a nonwoven material, a woven material, or a foam. The method further comprises attaching the plurality of microcapsules to the first major surface of the substrate with a polymeric material, thereby forming a polymeric matrix attached to the first major surface of the substrate.

The following description of embodiments of the present disclosure relates to either one or both of the above aspects.

Suitable substrates typically include materials that are compressible and/or porous, specifically a nonwoven material, a woven material, or a foam. Advantageously, employing a compressible and/or porous substrate allows the article to be stored, transported, or both, in the form of a roll. For instance, a continuously formed article ten to hundreds of meters long can be rolled up into a single roll for ease of handling. The compressible and/or porous characteristics of the substrate prevent rupture of the attached microcapsules under the force of the weight of the rolled article, yet it is not necessary to employ a large force to rupture the microcapsules when desired, to adhere the article to another material. In certain embodiments, the compressibility of the substrate is characterized in terms of compressive strength. Suitable substrates generally comprise a compressive strength of at least 10 Pascals (Pa), or at least 25 Pa, or at least 50 Pa, or even at least 100 Pa, and up to 20,000 Pa, or up to 50,000 Pa, or up to 75,000 Pa, or even up to 100,000 Pa. In an embodiment, the substrate comprises a compressive strength of from 10 Pa to 100,000 or from 50 Pa to 20,000 Pa. With respect to density, in certain embodiments, suitable substrates comprise a density of at least 0.01 grams per milliliter (g/mL), or at least 0.02 g/mL, or even at least 0.03 g/mL, and up to 0.5 g/mL or up to 0.60 g/mL, or up to 0.75 g/mL. The substrate optionally comprises a density of from 0.01 g/mL to 0.75 g/mL, or from 0.02 g/mL to 0.60 g/mL.

In certain embodiments, the substrate comprises a nonwoven material, such as felt, and optionally comprises a wetlaid material or a drylaid material. Typically, a nonwoven substrate comprises inorganic fibers, organic fibers, or combinations thereof. The substrate preferably comprises glass fibers, silica fibers, basalt fibers, polyamide fibers, polyolefin fibers, acrylic fibers, polyester fibers, cellulose fibers, wool fibers, rayon fibers, carbon fibers, or combinations thereof. Suitable nonwoven substrates comprise a web having a structure of individual fibers or filaments, which are interlaid, but not in an identifiable manner as in a knitted fabric. Nonwoven fabrics or webs have been formed from many processes such as for example, meltblowing processes, spunbonding processes, bonded carded web processes, wetlaid processes, and drylaid processes.

In one suitable drylaid process, bundles of small fibers having typical lengths ranging from about 3 to about 52 millimeters (mm) are separated and entrained in an air supply and then deposited onto a forming screen, usually with the assistance of a vacuum supply. The randomly deposited fibers may then be bonded to one another using, for example, thermal point bonding, autogenous bonding, hot air bonding, needle punching, calendering, a spray adhesive, and the like. Such an exemplary air-laying process is taught in, for example, U.S. Pat. No. 4,640,810 (Laursen et al.).

In one suitable wetlaid process, bundles of small fibers having typical lengths ranging from about 3 to about 52 millimeters (mm) are separated and entrained in a liquid supply and then deposited onto a forming screen, usually with the assistance of a vacuum supply. Water is typically the preferred liquid. The randomly deposited fibers may by further entangled (e.g., hydro-entangled), or may be bonded to one another using, for example, thermal point bonding, autogenous bonding, hot air bonding, ultrasonic bonding, needle punching, calendering, application of a spray adhesive, and the like. An exemplary wetlaid and bonding process is taught in, for example, U.S. Pat. No. 5,167,765 (Nielsen et al.). Exemplary bonding processes are also disclosed in, for example, U.S. Patent Application Publication No. 2008/0038976 A1 (Berrigan et al.).

Figure 3:
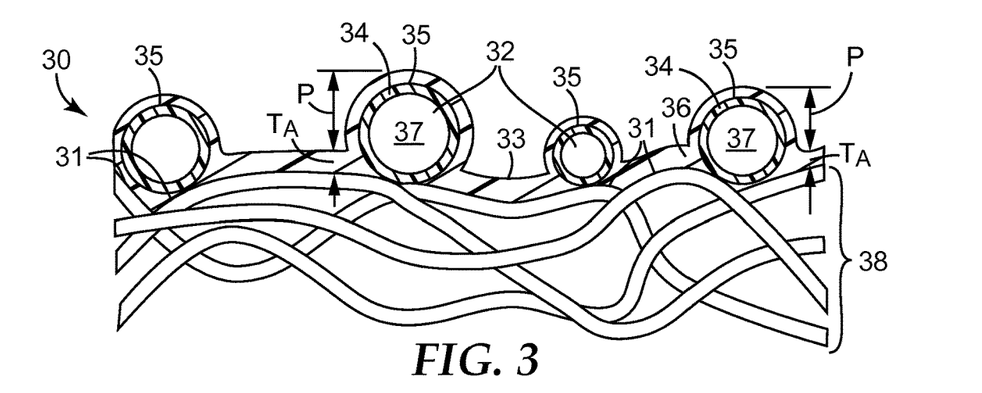
FIG. 3 is another exemplary cross-sectional schematic of an article including microcapsules attached to a nonwoven substrate with a polymeric material.

Referring to FIG. 3, an exemplary cross-sectional schematic is provided of an article comprising a substrate comprising a nonwoven material. The article 30 comprises a nonwoven substrate 38 having a first major surface 31, and a plurality of microcapsules 32 are illustrated to be attached to the first major surface 31 of the substrate 38 with a polymeric material 36. Each microcapsule 32 comprises an outer surface 35, a plasticizer 37 disposed within the microcapsule 32, and a shell 34 that encloses the plasticizer 37. The polymeric material 36 has an average thickness $T_A$ covering the first major surface 31 of the substrate 38, and each of the plurality of microcapsules 32 comprises a portion that is located above the upper surface 33 of the coating of the polymeric material 36 on the first major surface 31 of the substrate 38. The distance between the upper surface 33 of the polymeric material 36 coating and the outer surface 35 at the top of each microcapsule 32, P, indicates the extent of protrusion of each microcapsule 32 above the average polymeric material 36 coating thickness. FIG. 3 also illustrates an embodiment in which the outer surface 35 of each microcapsule is completely coated with polymeric material 36.

In certain embodiments, the substrate comprises a woven material, for instance a fabric. Typically, the substrate comprises inorganic fibers, organic fibers, or combinations thereof. As with nonwoven materials, in embodiments wherein the substrate comprises a woven material, the substrate preferably comprises glass fibers, polyamide fibers, polyolefin fibers, acrylic fibers, polyester fibers, cellulose fibers, wool fibers, rayon fibers, carbon fibers, or combinations thereof.

In certain embodiments, the substrate comprises a foam, such as a sponge (natural or synthetic), a cushion, or insulation. Suitable foams include for example and without limitation, a polymeric foam comprising a polyolefin, a polyurethane, a poly(meth)acrylate, or neoprene.

Advantageously, the polymeric material comprises a non-tacky material, which prevents adhesion of the substrate to another material until plasticizer is released from the microcapsules. Non-tacky polymers according to the present disclosure have a glass transition temperature ($T_g$) greater than about 0° C. In certain embodiments, the polymeric material comprises a $T_g$ greater than 0° C., or greater than 5° C., or greater than 10° C., or greater than 15° C., or greater than 20° C., or greater than 25° C., or greater than 30° C., or greater than 40° C., or even greater than 50° C. The higher the $T_g$, the less likely it will be for the polymeric material over time to behave as an adhesive prior to being contacted with the plasticizer from within the microcapsules. This polymer can be a homopolymer, a copolymer, or a blend of polymers or blends of polymer and tackifier. In some cases, a homopolymer with a $T_g$ greater than 0° C. could be used, for example, (meth)acrylate homopolymers or amorphous polyesters. In many cases, a copolymer is preferred where at least one of the comonomers is a high $T_g$ monomer. These copolymers could be (meth)acrylates or polyurethanes.

Methods for formulating non-tacky (meth)acrylate polymers are disclosed in U.S. Pat. No. 6,624,273. For instance, essentially non-tacky, polymeric material is plasticized into pressure-sensitive adhesives. Plasticized polymer based pressure-sensitive adhesives optionally comprise about 100 parts by weight of a base copolymer having a $T_g$ greater than about 0° C. and about 1 to about 100 parts based on the base copolymer of a non-reactive, non-volatile, non-acrylic-based plasticizing agent. The base copolymer is formed from and comprises: (1) about 50 to 70% by weight of a high $T_g$ comonomer component, wherein the homopolymer formed from the high $T_g$ comonomer component has a $T_g$ of at least about 20° C.; (2) optionally, up to about 20% by weight based on the total weight of the base copolymer of an acidic comonomer; and (3) about 30 to 50% by weight of one or more low $T_g$ (meth)acrylate comonomer, wherein the $T_g$ of the homopolymer of the low $T_g$ comonomer is less than about 20° C. The base copolymer of the plasticized pressure sensitive adhesive composition of such an embodiment is low in tack or totally tack-free at room temperature (i.e. about 20 to 25° C.). The base copolymer derives its low tack or no tack characteristics at room temperature from its high $T_g$ and high shear storage modulus. In general, the high $T_g$ and high modulus base copolymers have significant glassy character and are non-elastomeric in nature. The $T_g$ of the base copolymer can be determined by either analytical methods, such as well known calorimetric or dynamic/mechanical techniques, or may be calculated based on the types and proportion of comonomers used to form the copolymer. For the purposes of the present application, the $T_g$ of the base copolymers is calculated using the $T_g$ of the homopolymers of each comonomer and the weight fraction of the comonomers, as shown in the following equation of Fox, T. G., Bull. Am. Phys. Soc. (Ser. 2) 1:123 (156):

$$1/T_g = W_a/T_{ga} + W_b/T_{gb} + W_c/T_{gc}$$

wherein $T_g$, $T_{ga}$, $T_{gb}$ and $T_{gc}$ designate the glass transition temperature (in Kelvin (K)) of a terpolymer of comonomers a, b and c, a homopolymer of comonomer a, a homopolymer of comonomer b, and a homopolymer of comonomer c, respectively. $W_a$, $W_b$ and $W_c$ are the weight fractions of comonomers a, b, and c, respectively, wherein $W_a + W_b + W_c = 1$. In addition to having a $T_g$ that is at least about 0° C., the low tack or non-tacky base copolymers also typically possess a shear storage modulus of at least $5 \times 10^5$ Pascals at 23° C. and 1 Hertz (Hz). This threshold (as described by D. Satas in The Handbook of Pressure Sensitive Adhesive Technology, 2nd ed., Von Nostrand Reinhold: New York, p. 172-173 (1989), incorporated by reference herein) exceeds the Dahlquist Criterion which states that, to exhibit pressure sensitive adhesive properties at room temperature (i.e., to be "tacky"), such pressure sensitive adhesive must have a 1-second creep compliance greater than $1 \times 10^{-6}$ cm$^2$/dyne. This creep compliance value translates into a maximum shear storage modulus of $5 \times 10^6$ dynes/cm$^2$ or $5 \times 10^5$ Pascals, at 23° C. and 1 Hz. Thus, to transform the base copolymer to a material that exhibits pressure sensitive adhesive properties, the plasticizing agent should be chosen to lower the base copolymer's $T_g$ to below about 10° C., preferably below 0° C., and its shear storage modulus to below the Dahlquist Criterion.

In other cases, a blend of polymer with a tackifier could be used. In these cases, the polymer alone may have a $T_g$ below about 0° C., but sufficient tackifier is added to bring the $T_g$ of the blend to a higher temperature, above about 0° C. The polymers in this case could be (meth)acrylate polymers, urethane, natural rubber, or block copolymers, and tackifiers would be typical tackifiers.

Suitable polymeric materials comprise a (meth)acrylate homopolymer, an amorphous polyester homopolymer, a (meth)acrylate copolymer, a polyurethane copolymer, or a combination thereof.

Figure 4:
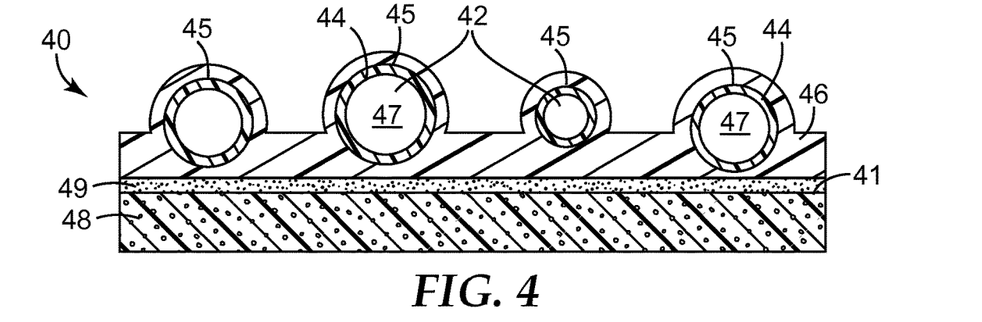
FIG. 4 is a further exemplary cross-sectional schematic of an article including microcapsules attached to a substrate with a polymeric material.

In one embodiment, the polymeric material is attached to the substrate with an adhesive. For example, the article optionally comprises a pressure sensitive adhesive disposed between the polymeric material and the substrate. FIG. 4 provides an exemplary cross-sectional schematic of an article including microcapsules attached to a nonwoven substrate with a polymeric material. The article 40 comprises a substrate 48 having a first major surface 41, and a plurality of microcapsules 42 are illustrated to be attached to the first major surface 41 of the substrate 48 with a polymeric material 46, which is in turn directly attached to the first major surface 41 of the substrate 48 with an adhesive 49. In the embodiment of FIG. 4, the substrate 48 comprises a foam. Each microcapsule 42 comprises an outer surface 45, a plasticizer 47 disposed within the microcapsule 42, and a shell 44 that encloses the plasticizer 47. A suitable pressure sensitive adhesive comprises a (meth)acrylate adhesive. According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface. These requirements are assessed generally by means of tests which are designed to individually measure tack, adhesion (peel strength), and cohesion (shear holding power), as noted by A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

According to aspects of the present disclosure, the microcapsules function to provide a plasticizer, which, upon being released from the microcapsules, will soften the polymeric material and impart tackiness to the material for adhesion. The microcapsules thus are designed to secure a plasticizer within the microcapsules until adhesion is required, and often comprise shells comprising polyurea formaldehyde, cellulosic materials, copolymers of isobornyl methacrylate with (meth)acrylic acid, nylon, polyurethane, polyurea, polycarbonate, and polymers formed from urea, formaldehyde and melamine monomers. Suitable microcapsules can be prepared using known interfacial polymerization techniques, to produce continuous-wall, non-porous microcapsules comprising these monomeric species.

The size of the microcapsules is not particularly limited. In many embodiments, the plurality of microcapsules comprises an average microcapsule diameter of at least 10 micrometers (μm), or at least 15 μm, or at least 25 μm, or at least 50 μm, or at least 75 μm, or at least 100 μm, or even at least 125 μm. The plurality of microcapsules comprises an average microcapsule diameter of up to 150 micrometers (μm), or up to 200 μm, or up to 300 μm, or up to 400 μm, or up to 500 μm, or up to 750 μm, or even up to 1000 μm. Optionally, the plurality of microcapsules comprises an average microcapsule diameter of from 25 μm to 1000 μm, or from 50 μm to 500 μm, or from 100 μm to 300 μm.

Plasticizing agents selected for use to soften and tackify the polymeric material possess a range of properties. Generally, the plasticizer can be liquid or solid, have a range of molecular weights and architecture, is compatible with the base copolymers, monomeric or polymeric, non-volatile and non-reactive. Additionally, mixtures of solid and liquid, monomeric and polymeric and other combinations of plasticizers can be used in the present invention. Suitable plasticizers for use in aspects of the present disclosure include for example and without limitation, a phosphate ester, a benzoyl functionalized polyether, a polyalkylene oxide, an alkyl or aryl functionalized polyalkylene oxide, a monomethyl ether of polyethylene oxide, a monomeric adipate, a polymeric adipate, a citrate, a glutarate, a trimellitate, a sebacate, a polyester, or a combination thereof. Particularly useful plasticizers include polyalkylene oxides having weight average molecular weights of about 150 to about 5,000, preferably of about 150 to about 1,500, such as polyethylene oxides, polypropylene oxides, polyethylene glycols; alkyl or aryl functionalized polyalkylene oxides, such as PYCAL 94 (a phenyl ether of polyethylene oxide, commercially available from ICI Chemicals); benzoyl functionalized polyethers, such as Benzoflex 400 (polypropylene glycol dibenzoate, commercially available from Velsicol Chemicals) and monomethyl ethers of polyethylene oxides; monomeric adipates such as dioctyl 10 adipate, dibutoxyethoxyethyl adipate and dibutoxypropoxypropyl adipate; polymeric adipates such as polyester adipates; citrates, such as acetyltri-n-butyl citrate, phthalates such as butyl benzylphthalates, trimellitates, sebacates, polyesters, such as those known under the tradename Paraplex (available from C.P. Hall Co); phosphate esters, such as those known under the tradename Santicizer (available from Monsanto) such as 2-ethylhexyl diphenyl diphosphate and t-butylphenyl diphenyl phosphate; glutarates such as Plasthall 7050 (a dialkyl diether glutarate available from C.P. Hall Co.); and mixtures thereof.

In select embodiments, the plurality of microcapsules further comprises a solvent encapsulated in the microcapsules, which is typically an aprotic solvent. One or more solvents are selected to remain within the shell of a microcapsule rather than leaking or evaporating out of the microcapsule prior to rupture of the microcapsule. The solvent often comprises a hydrocarbon, an aromatic hydrocarbon, a halogenated hydrocarbon, a halogenated aromatic hydrocarbon, a substituted aromatic solvent, a ketone, an ester, an amide, a nitrile, a sulfoxide, or combinations thereof. Suitable solvents include for example and without limitation, cyclohexane, toluene, xylenes, hexane, heptanes, mesitylene, dichloromethane, chlorobenzene, dichlorobenzene, nitrobenzene, tetrahydrofuran (THF), dioxane, acetone, methyl ethyl ketone, ethyl acetate, butyl acetate, phenylacetate, ethyl phenylacetate, dimethyl acetamide (DMA), dimethyl formamide (DMF), acetonitrile, dimethyl sulfoxide (DMSO), or a combination thereof. Preferably, the solvent comprises xylenes, toluene, mesitylene, butyl acetate, heptanes, hexane, chlorobenzene, or a combination thereof. Advantageously, when a solvent is present the nonwoven, woven, or foam material of the substrate allows for efficient evaporation of the solvent during drying and/or curing of the polymeric material upon adhesion of the substrate to another material. This is due to the generally porous nature of nonwoven, woven, and foam materials, and typically solvent may evaporate out of the substrate through a second major surface of the substrate opposite the first major substrate.

The amount of microcapsules attached to a substrate will depend on the specific application. For articles in which adhesion is required on only a select portion of the substrate, fewer microcapsules will be needed, and they may be applied in patterns if desired. In certain embodiments, the substrate comprises an average of at least 1% area coverage on the first major surface by the plurality of microcapsules, or at least 2%, or at least 3%, or at least 4%, or at least 5%, or at least 10%, or at least 15%, or at least 20%, or at least 30%, or even at least 35% area coverage on the first major surface by the plurality of microcapsules. In certain embodiments, the substrate comprises an average of up to 20%, or up to 25%, or up to 30%, or up to 35%, or up to 40%, or up to 50%, or up to 60%, or up to 75% area coverage on the first major surface by the plurality of microcapsules. Optionally, the substrate comprises an average of from 1% to 50%, from 4% to 25%, or 30% to 50% area coverage on the first major surface by the plurality of microcapsules.

The amount of polymeric material employed can conveniently be described as the weight of the dry polymeric material per area of substrate covered. Suitable amounts of polymeric material include an average coating weight of dry polymeric material of at least 5 grams per square meter (gsm) of covered substrate, or at least 10 gsm, or at least 15 gsm, or at least 20 gsm, or at least 25 gsm of coated substrate, and up to 30 gsm, or up to 40 gsm, or up to 50 gsm, or up to 75 gsm, or up to 100 gsm, or up to 150 gsm, or up to 200 gsm of covered substrate. In certain embodiments, the substrate comprises an average coating weight of dry polymeric material of from 5 gsm to 200 gsm, or 10 gsm to 100 gsm, or from 15 gsm to 50 gsm of the covered area of the substrate. The amount of microcapsules and the amount of polymeric material are generally interrelated, thus in an embodiment, the substrate comprises an average of from 4% to 25% area coverage on the first major surface by the plurality of microcapsules and an average coating weight of dry polymeric material of from 15 to 50 gsm of the covered area of the substrate, or the substrate comprises an average of from 30% to 50% area coverage on the first major surface by the plurality of microcapsules and an average coating weight of dry polymeric material of from 30 to 200 gsm of the covered area of the substrate. The average coating weight of dry polymeric material can also be converted to an average coating thickness using the following formula: (average coating weight in gsm/(density of dry coating in $g/cm^3$))*(0.0001 $m^2/cm^2$)=thickness in centimeters.

The mode of attachment of the microcapsules to the first major surface of the substrate is not strictly limited. For instance, in certain embodiments, the attaching comprises depositing the plurality of microcapsules on the first major surface of the substrate and coating the polymeric material onto a majority of the plurality of microcapsules and at least a portion of the first major surface of the substrate. In such embodiments the coating typically comprises spray coating, transfer coating, or roll coating. In other embodiments, the attaching comprises mixing the plurality of microcapsules with the polymeric material to form a mixture, and coating the mixture onto the first major surface of the substrate. The ratio of the amount of microcapsules to polymeric material in such embodiments is selected such that the average height (i.e., diameter) of the microcapsules will be taller than the average thickness of the polymeric material when it is coated onto the surface of the substrate, once the polymeric material has dried and/or cured. In certain embodiments, the attaching comprises depositing the plurality of microcapsules onto the polymeric material and contacting the first major surface of the substrate with the deposited plurality of microcapsules and the polymeric material. Typically, the microcapsules remain on the surface of the polymeric material and the surface of the substrate is dipped into the polymeric material to transfer both the microcapsules and sufficient polymeric material to attach the microcapsules to the substrate surface. Regardless of the mode of attaching the plurality of microcapsules to the first major surface of the substrate, the method preferably further comprises curing the polymeric material.

In most embodiments, the plurality of microcapsules comprises a coating of the polymeric material on at least a portion of the outer surface of each microcapsule. Providing polymeric material coated on at least some portion of the outer surface of each microcapsule has been discovered to improve the strength of the attachment of the microcapsules to the substrate. Moreover, following rupture of the microcapsules, microcapsule shell material coated with polymeric material will become embedded into the polymeric material softened by plasticizer more easily than microcapsule shell material that is not coated with polymeric material but is instead disposed on the surface of the polymeric material.

To enhance the ability to fracture the microcapsules when desired, the size of the microcapsules and the thickness of the coating of polymeric material are selected such that at least a portion of some of the microcapsules extends beyond the upper plane of a coating of the polymeric material on the surface of the substrate. With microcapsules having a larger average diameter, a thicker coating of polymeric material may be used, whereas with microcapsules having a smaller average diameter, a thinner coating of polymeric material may be used. Accordingly, in certain embodiments a ratio of the average diameter of the plurality of microcapsules to the average coating thickness of the polymeric material on the substrate comprises at least 1.1, or at least 1.2, or at least 1.3, or at least 1.5, or at least 1.8, or at least 2, or at least 5, or even at least 8, and up to 2, or up to 3, or up to 4, or up to 5, or up to 6, or up to 8, or up to 10, or up to 25, or up to 50, or up to 75, or even up to 100. In aspects, a ratio of the average diameter of the plurality of microcapsules to the average coating thickness of the polymeric material on the substrate comprises 1.1 to 100, or 1.3 to 10, or 2 to 6.

Various items are described that are articles or methods of making articles.

Item 1 is an article comprising a substrate having a first major surface, the substrate comprising a nonwoven material, a woven material, or a foam. The article further includes a plurality of microcapsules comprising an outer surface and a plasticizer encapsulated in the microcapsules, where the plurality of microcapsules are attached to the first major surface of the substrate with a polymeric material.

Item 2 is an article of item 1, wherein the polymeric material comprises a glass transition temperature ($T_g$) greater than 0° C.

Item 3 is an article of item 1 or item 2, wherein the polymeric material comprises a $T_g$ greater than 25° C.

Item 4 is an article of any one of items 1 to 3, wherein the plurality of microcapsules comprises a coating of the polymeric material on at least a portion of the outer surface of each microcapsule.

Item 5 is an article of any one of items 1 to 4, wherein the polymeric material comprises a (meth)acrylate homopolymer, an amorphous polyester homopolymer, a (meth)acrylate copolymer, a polyurethane copolymer, or a combination thereof.

Item 6 is an article of any one of items 1 to 5, wherein the substrate comprises a nonwoven material.

Item 7 is an article of any one of items 1 to 6, wherein the substrate comprises felt.

Item 8 is an article of any one of items 1 to 7, wherein the substrate comprises a wetlaid material.

Item 9 is an article of any one of items 1 to 7, wherein the substrate comprises a drylaid material.

Item 10 is an article of any one of items 1 to 9, wherein the substrate comprises inorganic fibers, organic fibers, or combinations thereof.

Item 11 is an article of any one of items 1 to 10, wherein the substrate comprises glass fibers, silica fibers, basalt fibers, polyamide fibers, polyolefin fibers, acrylic fibers, polyester fibers, cellulose fibers, wool fibers, rayon fibers, carbon fibers, or combinations thereof.

Item 12 is an article of any one of items 1 to 5, wherein the substrate comprises a woven material.

Item 13 is an article of any one of items 1 to 5 or 12, wherein the substrate comprises fabric.

Item 14 is an article of any one of items 1 to 5 or 12 to 13, wherein the substrate comprises inorganic fibers, organic fibers, or combinations thereof.

Item 15 is an article of any one of items 1 to 5 or 11 to 13, wherein the substrate comprises glass fibers, silica fibers, basalt fibers, polyamide fibers, polyolefin fibers, acrylic fibers, polyester fibers, cellulose fibers, wool fibers, rayon fibers, carbon fibers, or combinations thereof.

Item 16 is an article of any one of items 1 to 5, wherein the substrate comprises a foam.

Item 17 is an article of any one of items 1 to 5 or 16, wherein the substrate comprises a polymeric foam comprising a polyolefin, a polyurethane, a poly(meth)acrylate, or neoprene.

Item 18 is an article of any one of items 1 to 5 or 16, wherein the substrate comprises a sponge, a cushion, or insulation.

Item 19 is an article of any one of items 1 to 18, wherein the plurality of microcapsules comprises an average microcapsule diameter of from 25 to 1000 microns.

Item 20 is an article of any one of items 1 to 19, wherein the plurality of microcapsules comprises an average microcapsule diameter of from 50 to 500.

Item 21 is an article of any one of items 1 to 20, wherein the plurality of microcapsules comprises an average microcapsule diameter of from 100 to 300.

Item 22 is an article of any one of items 1 to 21, wherein the plurality of microcapsules comprises shells comprising polyurea formaldehyde, cellulosic materials, copolymers of isobornyl methacrylate with (meth)acrylic acid, nylon, polyurethane, polyurea, polycarbonate, and polymers formed from urea, formaldehyde and melamine monomers.

Item 23 is an article of any one of items 1 to 22, wherein the plasticizer comprises a phosphate ester, a benzoyl functionalized polyether, a polyalkylene oxide, an alkyl or aryl functionalized polyalkylene oxide, a monomethyl ether of polyethylene oxide, a monomeric adipate, a polymeric adipate, a citrate, a glutarate, a trimellitate, a sebacate, a polyester, or a combination thereof.

Item 24 is an article of any one of items 1 to 23, wherein the plurality of microcapsules further comprises a solvent encapsulated in the microcapsules.

Item 25 is an article of item 24, wherein the solvent comprises an aprotic solvent.

Item 26 is an article of item 24 or item 25, wherein the solvent comprises a hydrocarbon, an aromatic hydrocarbon, a halogenated hydrocarbon, a halogenated aromatic hydrocarbon, a substituted aromatic solvent, a ketone, an ester, an amide, a nitrile, a sulfoxide, or combinations thereof.

Item 27 is an article of any one of items 24 to 26, wherein the solvent comprises cyclohexane, toluene, xylenes, hexane, heptanes, mesitylene, dichloromethane, chlorobenzene, dichlorobenzene, nitrobenzene, tetrahydrofuran (THF), dioxane, acetone, methyl ethyl ketone, ethyl acetate, butyl acetate, phenylacetate, ethyl phenylacetate, dimethyl acetamide (DMA), dimethyl formamide (DMF), acetonitrile, dimethyl sulfoxide (DMSO), or a combination thereof.

Item 28 is an article of any one of items 24 to 27, wherein the solvent comprises xylenes, toluene, mesitylene, butyl acetate, heptanes, hexane, chlorobenzene, or a combination thereof.

Item 29 is an article of any one of items 1 to 28, wherein a ratio of the average diameter of the plurality of microcapsules to the average coating thickness of the polymeric material on the substrate comprises 1.1 to 100.

Item 30 is an article of any one of items 1 to 29, wherein a ratio of the average diameter of the plurality of microcapsules to the average coating thickness of the polymeric material on the substrate comprises 1.3 to 10.

Item 31 is an article of any one of items 1 to 30, wherein a ratio of the average diameter of the plurality of microcapsules to the average coating thickness of the polymeric material on the substrate comprises 2 to 6.

Item 32 is an article of any one of items 1 to 31, wherein the substrate comprises an average of from 1% to 50% area coverage on the first major surface by the plurality of microcapsules.

Item 33 is an article of any one of items 1 to 32, wherein the substrate comprises an average of from 4% to 25% area coverage on the first major surface by the plurality of microcapsules.

Item 34 is an article of any one of items 1 to 32, wherein the substrate comprises an average of from 30% to 50% area coverage on the first major surface by the plurality of microcapsules.

Item 35 is an article of any one of items 1 to 34, wherein the substrate comprises an average coating weight of dry polymeric material of from 5 to 200 grams per square meter of the covered area of the substrate.

Item 36 is an article of any one of items 1 to 35, wherein the substrate comprises an average coating weight of dry polymeric material of from 10 to 100 grams per square meter of the covered area of the substrate.

Item 37 is an article of any one of items 1 to 36, wherein the substrate comprises an average coating weight of dry polymeric material of from 15 to 50 grams per square meter of the covered area of the substrate.

Item 38 is an article of any one of items 1 to 33, wherein the substrate comprises an average of from 4% to 25% area coverage on the first major surface by the plurality of microcapsules and an average coating weight of dry polymeric material of from 15 to 50 grams per square centimeter of the covered area of the substrate.

Item 39 is an article of any one of items 1 to 32, wherein the substrate comprises an average of from 30% to 50% area coverage on the first major surface by the plurality of microcapsules and an average coating weight of dry polymeric material of from 30 to 200 grams per square centimeter of the covered area of the substrate.

Item 40 is an article of any one of items 1 to 39, wherein the substrate comprises a compressive strength of from 10 Pascals (Pa) to 100,000 Pa.

Item 41 is an article of any one of items 1 to 40, wherein the substrate comprises a compressive strength of from 50 Pa to 20,000 Pa.

Item 42 is an article of any one of items 1 to 41, wherein the substrate comprises a density of from 0.01 grams per milliliter (g/mL) to 0.75 g/mL.

Item 43 is an article of any one of items 1 to 42, wherein the substrate comprises a density of from 0.02 g/mL to 0.60 g/mL.

Item 44 is an article of any one of items 1 to 43, further comprising a pressure sensitive adhesive disposed between the polymeric material and the substrate.

Item 45 is an article of item 43, wherein the pressure sensitive adhesive comprises a (meth)acrylate adhesive.

Item 46 is a method of making an article including providing a substrate having a first major surface, the substrate comprising a nonwoven material, a woven material, or a foam, and providing a plurality of microcapsules comprising an outer surface and a plasticizer encapsulated in the microcapsules. The method further includes attaching the plurality of microcapsules to the first major surface of the substrate with a polymeric material, thereby forming a polymeric matrix attached to the first major surface of the substrate.

Item 47 is a method of item 46, wherein the polymeric material comprises a $T_g$ greater than 0° C.

Item 48 is a method of item 46 or item 47, wherein the polymeric material comprises a $T_g$ greater than 25° C.

Item 49 is a method of any one of items 46 to 48, wherein the plurality of microcapsules comprises a coating of the polymeric material on at least a portion of the outer surface of each microcapsule.

Item 50 is a method of any one of items 46 to 49, wherein the polymeric material comprises a (meth)acrylate homopolymer, an amorphous polyester homopolymer, a (meth)acrylate copolymer, a polyurethane copolymer, or a combination thereof.

Item 51 is a method of any one of items 46 to 50, wherein the polymeric material comprises a water-based latex polymeric material, a solvent-based polymeric material, or a hot melt polymeric material.

Item 52 is a method of any one of items 46 to 51, wherein the attaching comprises depositing the plurality of microcapsules on the first major surface of the substrate and coating the polymeric material onto a majority of the plurality of microcapsules and at least a portion of the first major surface of the substrate.

Item 53 is a method of item 52, wherein the coating comprises spray coating, transfer coating, or roll coating.

Item 54 is a method of any one of items 46 to 51, wherein the attaching comprises mixing the plurality of microcapsules with the polymeric material to form a mixture, and coating the mixture onto the first major surface of the substrate.

Item 55 is a method of any one of items 46 to 51, wherein the attaching comprises depositing the plurality of microcapsules onto the polymeric material and contacting the first major surface of the substrate with the deposited plurality of microcapsules and the polymeric material.

Item 56 is a method of any one of items 46 to 55, further comprising curing the polymeric material.

Item 57 is a method of any one of items 46 to 56, wherein the substrate comprises a nonwoven material.

Item 58 is a method of any one of items 46 to 57, wherein the substrate comprises felt.

Item 59 is a method of any one of items 46 to 58, wherein the substrate comprises a wetlaid material.

Item 60 is a method of any one of items 46 to 58, wherein the substrate comprises a drylaid material.

Item 61 is a method of any one of items 46 to 60, wherein the substrate comprises inorganic fibers, organic fibers, or combinations thereof.

Item 62 is a method of any one of items 46 to 61, wherein the substrate comprises glass fibers, silica fibers, basalt fibers, polyamide fibers, polyolefin fibers, acrylic fibers, polyester fibers, cellulose fibers, wool fibers, rayon fibers, carbon fibers, or combinations thereof.

Item 63 is a method of any one of items 46 to 56, wherein the substrate comprises a woven material.

Item 64 is a method of any one of items 46 to 56 or 63, wherein the substrate comprises fabric.

Item 65 is a method of any one of items 46 to 56 or 63 to 64, wherein the substrate comprises inorganic fibers, organic fibers, or combinations thereof.

Item 66 is a method of any one of items 46 to 56 or 63 to 65, wherein the substrate comprises rayon.

Item 67 is a method of any one of items 46 to 56, wherein the substrate comprises a foam.

Item 68 is a method of any one of items 46 to 56 or 67, wherein the substrate comprises a polymeric foam comprising a polyolefin, a polyurethane, a poly(meth)acrylate, or neoprene.

Item 69 is a method of any one of items 46 to 56 or 67, wherein the substrate comprises a sponge, a cushion, or insulation.

Item 70 is a method of any one of items 46 to 69, wherein the plurality of microcapsules comprises an average microcapsule diameter of from 25 to 1000 microns.

Item 71 is a method of any one of items 46 to 70, wherein the plurality of microcapsules comprises an average microcapsule diameter of from 50 to 500.

Item 72 is a method of any one of items 46 to 71, wherein the plurality of microcapsules comprises an average microcapsule diameter of from 100 to 300.

Item 73 is a method of any one of items 46 to 72, wherein the plurality of microcapsules comprises shells comprising polyurea formaldehyde, cellulosic materials, copolymers of isobornyl methacrylate with (meth)acrylic acid, nylon, polyurethane, polyurea, polycarbonate, and polymers formed from urea, formaldehyde and melamine monomers.

Item 74 is a method of any one of items 46 to 73, wherein the plasticizer comprises a phosphate ester, a benzoyl functionalized polyether, a polyalkylene oxide, an alkyl or aryl functionalized polyalkylene oxide, a monomethyl ether of polyethylene oxide, a monomeric adipate, a polymeric adipate, a citrate, a glutarate, a trimellitate, a sebacate, a polyester, or a combination thereof.

Item 75 is a method of any one of items 46 to 74, wherein the plurality of microcapsules further comprises a solvent encapsulated in the microcapsules.

Item 76 is a method of item 75, wherein the solvent comprises an aprotic solvent.

Item 77 is a method of item 75 or item 76, wherein the solvent comprises a hydrocarbon, an aromatic hydrocarbon, a halogenated hydrocarbon, a halogenated aromatic hydrocarbon, a substituted aromatic solvent, a ketone, an ester, an amide, a nitrile, a sulfoxide, or combinations thereof.

Item 78 is a method of any one of items 75 to 77, wherein the solvent comprises cyclohexane, toluene, xylenes, hexane, heptanes, mesitylene, dichloromethane, chlorobenzene, dichlorobenzene, nitrobenzene, tetrahydrofuran (THF), dioxane, acetone, methyl ethyl ketone, ethyl acetate, butyl acetate, phenylacetate, ethyl phenylacetate, dimethyl acetamide (DMA), dimethyl formamide (DMF), acetonitrile, dimethyl sulfoxide (DMSO), or a combination thereof.

Item 79 is a method of any one of items 75 to 78, wherein the solvent comprises xylenes, toluene, mesitylene, butyl acetate, heptanes, hexane, chlorobenzene, or a combination thereof.

Item 80 is a method of any one of items 46 to 79, wherein a ratio of the average diameter of the plurality of microcapsules to the average coating thickness of the polymeric material on the substrate comprises 1.1 to 100.

Item 81 is a method of any one of items 46 to 80, wherein a ratio of the average diameter of the plurality of microcapsules to the average coating thickness of the polymeric material on the substrate comprises 1.3 to 10.

Item 82 is a method of any one of items 46 to 81, wherein a ratio of the average diameter of the plurality of microcapsules to the average coating thickness of the polymeric material on the substrate comprises 2 to 6.

Item 83 is a method of any one of items 46 to 82, wherein the substrate comprises an average of from 1% to 50% area coverage on the first major surface by the plurality of microcapsules.

Item 84 is a method of any one of items 46 to 83, wherein the substrate comprises an average of from 4% to 25% area coverage on the first major surface by the plurality of microcapsules.

Item 85 is a method of any one of items 46 to 83, wherein the substrate comprises an average of from 30% to 50% area coverage on the first major surface by the plurality of microcapsules.

Item 86 is a method of any one of items 46 to 85, wherein the substrate comprises an average coating weight of dry polymeric material of from 5 to 200 grams per square meter of the covered area of the substrate.

Item 87 is a method of any one of items 46 to 86, wherein the substrate comprises an average coating weight of dry polymeric material of from 10 to 100 grams per square meter of the covered area of the substrate.

Item 88 is a method of any one of items 46 to 87, wherein the substrate comprises an average coating weight of dry polymeric material of from 15 to 50 grams per square meter of the covered area of the substrate.

Item 89 is a method of any one of items 46 to 84, wherein the substrate comprises an average of from 4% to 25% area coverage on the first major surface by the plurality of microcapsules and an average coating weight of dry polymeric material of from 15 to 50 grams per square centimeter of the covered area of the substrate.

Item 90 is a method of any one of items 46 to 83, wherein the substrate comprises an average of from 30% to 50% area coverage on the first major surface by the plurality of microcapsules and an average coating weight of dry polymeric material of from 30 to 200 grams per square centimeter of the covered area of the substrate.

Item 91 is a method of any one of items 46 to 90, wherein the substrate comprises a compressive strength of from 10 Pa to 100,000 Pa.

Item 92 is a method of any one of items 46 to 91, wherein the substrate comprises a compressive strength of from 50 Pa to 20,000 Pa.

Item 93 is a method of any one of items 46 to 92, wherein the substrate comprises a density of from 0.01 g/mL to 0.75 g/mL.

Item 94 is a method of any one of items 46 to 93, wherein the substrate comprises a density of from 0.02 g/mL to 0.60 g/mL.

Item 95 is a method of any one of items 46 to 94, further comprising a pressure sensitive adhesive disposed between the polymeric material and the substrate.

Item 96 is a method of item 95, wherein the pressure sensitive adhesive comprises a (meth)acrylate adhesive.

EXAMPLES

Objects and advantages of this invention are further illustrated by the following examples, but the particular materials and amounts thereof recited in these examples, as well as other conditions and details, should not be construed to unduly limit this invention. These examples are for illustrative purposes only and are not meant to be limiting on the scope of the appended claims.

Materials

Unless otherwise noted, all parts, percentages, ratios, etc., in the examples and in the remainder of the specification are by weight. Unless otherwise noted, all chemicals were obtained from, or are available from, chemical suppliers such as Sigma-Aldrich Chemical Company, St. Louis, Mo.

TABLE 1

| Designation | Description | Manufacturer |
| --- | --- | --- |
| Rayon Sheet | Nonwoven with an acrylic binder with a total basis weight of 40-50 gsm based on rayon staple fibers approximately 3 cm in length, such as those available from Lenzing AG (Lenzing, Austria) | 3M, St. Paul, MN |
| 1250 NC | 3M INTERAM Thermal Insulation 1250NC | 3M, Cottage Grove, MN |
| 1525 HT | 3M INTERAM Mat Mount 1535HT | Sumitomo 3M, Tokyo, JP |
| SANTICIZER 261A | Alkyl Benzyl Phthalate | Ferro Corporation, Mayfield Heights, OH |
| Ethylene - Maleic Anhydride Copolymer | ZeMac E400 copolymer | Vertellus, Indianapolis, IN |

TABLE 1-continued

| Designation | Description | Manufacturer |
|---|---|---|
| Urea | Product Number 4206-01 | J. T. Baker, Phillipsburg, NJ |
| Ammonium Chloride | Product Number AX1270-1 | EMD Chemicals, Inc., Darmstadt, Germany |
| Resorcinol | Product Number R40-6 | Sigma-Aldrich, St. Louis, MO |
| Sodium Hydroxide | 0.1N Aqueous Solution, Product Number 5635-02 | J. T. Baker, Phillipsburg, NJ |
| Xylenes | Product Number XX0055P-4 | EMD Chemicals, Inc., Darmstadt, Germany |
| Formaldehyde Solution | 37% solution in water, Product Number 2106-01 | J. T. Baker, Phillipsburg, NJ |
| 1-Octanol | Product Number L08080 | Alfa Aesar, Pelham, NH |
| Hitenol BC1025 | Polyoxyethylene alkylphenyl surfactant | Montello Inc. |
| Isooctyl Acrylate | — | 3M, St. Paul, MN |
| Methacrylic Acid | 99% | Alfa Aesar, Pelham, NH |
| Acrylic Acid | 99% | Alfa Aesar, Pelham, NH |
| Isobornyl Acrylate | 99% | San Esters Corporation, New York, NY |
| 2-Carboxylethyl Acrylate | — | Sigma-Aldrich, St. Louis, MO |
| Acrylate Polymer | IOA/IBOA/AA: 15/80/5 copolymer Mw: 8000 g/mol | 3M, St. Paul, MN |
| Vazo 67 | 2,2'-Azobis(2-methylbutyronitrile) | Sigma-Aldrich, St. Louis, MO |
| Open Cell Foam | Polyurethane Foam Sheet, Product Number 5GCG4 | W. W. Grainger Inc., Lake Forest, IL |
| Knit Glass Fiber | 3.1 inch wide sheet knitted from 0.002 inch yarns of glass fibers. | |
| PET Liner | Polyethylene terephthalate sheet 0.002 inch (0.05 mm) thick | |
| Release Liner | CLEARSIL T10 silicone release liner | Solutia, Inc., Fieldale, VA |
| Super 77 Adhesive | Multipurpose Spray Adhesive, Product Number 77-Super-24oz | 3M, St. Paul, MN |

Test Methods

Compression Test Method

Materials for compression tests were cut into 4 inch×4 inch (10 centimeters (cm)×10 cm) test specimens. The sheets were then placed between steel platens in a Sintech load frame (from MTS Systems Corporation, Eden Prairie, Minn.) with a 200 pounds·force (lbf) (890 Newtons (N)) maximum capacity load cell. The sample was compressed at a rate of 10% compression per minute until more than 15% compression was reached. The load at 10% compression was then used to calculate the compressive strength of the material. Three replicate tests were done for each material, and the average value is reported in Table 2 below.

TABLE 2

| Material | Compressive Strength (at 10% Compression) |
|---|---|
| Open Cell Foam | 18000 Pa |
| 1250 NC | 96 Pa |
| 1525 HT | 170 Pa |

Density Test Method

Specimens were cut to 4 inch×4 inch (10 cm×10 cm) size and the thicknesses were measured with digital calipers while taking care to not compress the specimens. The exception was the knit glass fiber sample, which was cut to 3.08 inch×4.0 inch (7.8 cm×10 cm) size. The weight of the specimens was divided by the calculated volume to give the density. Three samples were weighed, and the average result is reported in Table 3 below.

TABLE 3

| Material | Density (g/mL) |
|---|---|
| Open Cell Foam | 0.029 |
| 1250 NC | 0.118 |
| 1525 HT | 0.147 |
| Rayon | 0.304 |
| Knit Glass Fiber | 0.531 |

180° Peel Test Method

The force required to peel the test material from a substrate at an angle of 180 degrees was measured using a peel force tester, model 3M90, obtained from Instrumentors, Inc., Strongsville, Ohio. The free end of the sample was doubled back nearly touching itself so the angle of removal was 180°. The free end was attached to the adhesion tester scale. The platen was then moved away from the scale at a speed of 12 in./min (0.305 m/min.), and the adhesive peel force was averaged for 5 seconds. At least three 5-second averages were measured, and those results were then averaged to produce the reported value.

Dynamic Mechanical Analysis Test Method

The glass transition temperatures of polymeric materials were measured using a Q800 dynamic mechanical analyzer (from TA Instruments, New Castle, Del.) equipped with shear sandwich clamps. The polymer films were folded onto themselves while on a hotplate with a surface temperature of 80° C. until the film laminate had a thickness between 0.5 mm and 1.0 mm. Two square pieces 1.0 cm×1.0 cm each were then cut from the laminate, measured for thickness, and mounted in the shear sandwich clamps. The dynamic mechanical analysis characterization was then performed with an amplitude of 15 microns and a temperature ramp from 0° C. to 100° C. with a ramp rate of 2.0° C. per minute. The temperature at which the tan delta trace reached its maximum value was reported as the glass transition temperature.

Preparatory Example 1

Microcapsules with Solvent and Plasticizer

A 600 milliliter (mL) glass beaker was charged with 200 grams (g) of deionized water and 50 g of a 2.5 wt. % aqueous solution of ethylene maleic anhydride copolymer. The beaker was put in a water bath with an overhead mixer and the stir rate was set to between 1200 and 1500 rotations per minute (RPM). Urea (5 g), ammonium chloride (0.5 g), and resorcinol (0.5 g) were added to the water mixture. The pH was adjusted to 3.5 with sodium hydroxide and then 60 g of a 9:1 xylenes:SANTICIZER 261A mixture was added all at once to the stirring mixture. After waiting 10 minutes, formalin solution (12.6 g) was added to the beaker. The beaker was covered with aluminum foil. The reaction ran at 55° C. for 4 hours. After cooling, the capsules were washed with water and filtered under vacuum filtration. The microcapsules were then placed through a series of sieves, and the size fraction that was isolated between the sieves with 425 micron openings and 106 micron openings was collected. The average diameter of the microcapsules was 138 microns with a standard deviation of 53 microns.

Preparatory Example 2

Microcapsules with SANTICIZER 261A

A 600 mL glass beaker was charged with 200 g of deionized water and 50 g of a 2.5 wt. % aqueous solution of ethylene maleic anhydride copolymer. The beaker was put in a water bath with an overhead mixer and the stir rate was set to between 1200 and 1500 RPM. Urea (5 g), ammonium chloride (0.5 g), and resorcinol (0.5 g) were added to the water mixture. The pH was adjusted to 3.5 with sodium hydroxide and then 60 g of SANTICIZER 261A was added all at once to the stirring mixture. After waiting 10 minutes, formalin solution (12.6 g) was added to the beaker. The beaker was covered with aluminum foil. The reaction ran at 55° C. for 4 hours. After cooling, the capsules were washed with water and filtered under vacuum filtration. The microcapsules were then placed through a series of sieves, and the size fraction that was isolated between the sieves with 425 micron openings and 106 micron openings was collected. The average diameter of the microcapsules was 193 microns with a standard deviation of 41 microns.

Preparatory Example 3

Microcapsules with SANTICIZER 261A

A 1 liter (L) glass beaker was charged with 250 mL of an aqueous 0.5% solution of ethylene maleic anhydride copolymer. The beaker was put in a water bath with an overhead mixer and the stir rate was set to 300 RPM. Urea (5 g), ammonium chloride (0.5 g), and resorcinol (0.5 g) were added to the water mixture. The pH was adjusted to 3.5 with 0.1 Normal (N) sodium hydroxide. One drop of 1-octanol was added, and 60 g of SANTICIZER 261A was then added. After waiting 10 minutes, formaldehyde solution (12.6 g) was added to the beaker. The beaker was covered with aluminum foil. The bath temperature was ramped up to 55° C. over 30 minutes. The reaction was then continued with stirring at 55° C. for an additional 3.5 hours. After cooling, the capsules were washed with water. The microcapsules were then placed through a series of sieves, and the size fraction that was isolated between the sieves with 425 micron openings and 106 micron openings was collected. The average diameter of the microcapsules was 349 microns with a standard deviation of 79 microns.

Preparatory Example 4

Acrylic Latex 23.1 g of Hitenol BC1025, 2.2 g of sodium phosphate dibasic, and 363.2 g of deionized water were added into a 1 L glass beaker and stirred to form an aqueous solution. 187 g of isooctyl acrylate, 4.8 g of acrylic acid, 4.8 g of methacrylic acid, 264.3 g of isobornyl acrylate, 10.4 g of 2-carboxylethyl acrylate, and 9.6 g of an acrylate polymer were added to a 1 L glass beaker and stirred to form a monomer solution. The monomer solution was poured into the aqueous phase in the beaker and mixed well. The content was divided into two equal portions and poured into a 1 L stainless steel Waring blender container. The content was homogenized with the blender at high speed setting for 2 minutes then poured into a 2 L resin flask equipped with a thermometer, mechanical agitation with glass retreat blade impeller, condenser, and nitrogen inlet tube. Potassium persulfate (0.44 g) was then added. The reaction mixture was stirred at 300 RPM under a nitrogen blanket, heated to 60° C., maintained at this temperature for 4 hours, then heated to 80° C., and cooked at this temperature for 1 hour. The latex was then cooled and filtered through cheesecloth to give a latex adhesive of 54.0% solids, pH of 4.3, and viscosity of 160 centipoises (cP) (at 30 RPM).

Preparatory Example 5

Acrylic Solution

Isooctyl acrylate (24.8 g), isobornyl acrylate (70 g), acrylic acid (5 g) and toluene (150 g) were added to a 1 L amber bottle. Vazo 67 initiator was added (0.2 g) and dissolved into the solution. The sample was purged with nitrogen for about 3 minutes and then capped and sealed with Teflon tape. The bottle was set in a laundrometer for 24 hours at 70° C. Toluene was then added to the solution to adjust the solids content to 37%.

Preparatory Example 6

Transfer Adhesive Precursor

Preparatory Example 4 was coated onto a polyethylene terephthalate (PET) liner using a knife coater with a 0.008 inch (0.20 mm) gap. The film was dried in a 70° C. oven for 45 seconds and was then laminated to a release liner. The PET liner was peeled away with some adhesive residue. The latex film on the release liner was then dried in a 70° C. oven for an additional 10 minutes. The result was a non-tacky film 0.003 inches (0.08 mm) thick with a coating weight of 72 grams per square meter. Dynamic mechanical analysis on a portion of this film showed a glass transition temperature of 50° C.

Example 1

Plasticizer Capsules on Rayon

A sheet of rayon nonwoven was cut to 20 inches by 14 inches (51 cm×36 cm). A section of that sheet was sprinkled with capsules from Preparatory Example 2 with an average of 6% area coverage as determined by analysis of images of the surface of the sheet. The sheet was then sprayed with latex from Preparatory Example 4 and dried in an oven at 160° F. (71° C.) for 10 minutes. The average coating weight of dry adhesive was 42 grams per square meter. A strip of that sample was cut into a strip of dimensions 1 inch by 6 inches (2.5 cm by 15.2 cm) and was placed with no added pressure against a stainless steel coupon that had been cleaned with heptanes. After resting in contact with the stainless steel for one minute, the sample was gently sheared on the surface and found to have developed no noticeable adhesion to the substrate. A 2.4 kilogram (kg) roller was then passed over the sample, and it was allowed to rest for an additional one minute. The sample was then peeled back in a 180° peel mode, and the average force to peel the sample was measured to be 0.52 ounces of force (0.14 N). The sample failed primarily by adhesive failure.

Example 2

Solvent and Plasticizer Capsules on Rayon

A sheet of rayon nonwoven was cut to 20 inches by 14 inches (51 cm×36 cm). A section of that sheet was sprinkled with capsules from Preparatory Example 1 with an average of 25% area coverage. The sheet was then sprayed with latex from Preparatory Example 4 and dried in an oven at 160° F. (71° C.) for 10 minutes. The average coating weight of dry adhesive was 42 grams per square meter. A strip of that sample was cut into a strip of dimensions 1 inch by 6 inches (2.5 cm by 15.2 cm) and was placed with no added pressure against a stainless steel coupon that had been cleaned with heptanes. After resting in contact with the stainless steel for one minute, the sample was gently sheared on the surface and found to have developed no noticeable adhesion to the substrate. A 2.4 kg roller was then passed over the sample, and it was allowed to rest for an additional one minute. The sample was then peeled back in a 180° peel mode, and the average force to peel the sample was measured to be 3.9 ounces of force (1.1 N). The sample failed primarily by adhesive failure.

Example 3

Plasticizer Capsules on 1250NC

A sheet of 1250 NC nonwoven was cut to 20 inches by 14 inches (51 cm×36 cm). A section of that sheet was sprinkled with capsules from Preparatory Example 2 with an average of 12% area coverage. The sheet was then sprayed with latex from Preparatory Example 4 and dried in an oven at 160° F. (71° C.) for 10 minutes. The average coating weight of dry adhesive was 35 grams per square meter. A strip of that sample was cut into a strip of dimensions 1 inch by 6 inches (2.5 cm by 15.2 cm) and was placed with no added pressure against a stainless steel coupon that had been cleaned with heptanes. After resting in contact with the stainless steel for one minute, the sample was gently sheared on the surface and found to have developed no noticeable adhesion to the substrate. A 7.3 kg roller was then passed over the sample, and it was allowed to rest for an additional one minute. The sample was then peeled back in a 180° peel mode, and the average force to peel the sample was measured to be 2.6 ounces of force (0.72 N). The sample failed primarily by adhesive failure.

Example 4

Solvent and Plasticizer Capsules on 1525HT

A sheet of 1535HT nonwoven was cut to 20 inches by 14 inches (51 cm×36 cm). A section of that sheet was sprinkled with capsules from Preparatory Example 1 with an average of 11% area coverage. The sheet was then sprayed with latex from Preparatory Example 4 and dried in an oven at 160° F. (71° C.) for 10 minutes. The average coating weight of dry adhesive was 33 grams per square meter. A strip of that sample was cut into a strip of dimensions 1 inch by 6 inches (2.5 cm by 15.2 cm) and was placed with no added pressure against a stainless steel coupon that had been cleaned with heptanes. After resting in contact with the stainless steel for one minute, the sample was gently sheared on the surface and found to have developed no noticeable adhesion to the substrate. A 7.3 kg roller was then passed over the sample, and it was allowed to rest for an additional one minute. The sample was then peeled back in a 180° peel mode, and the average force to peel the sample was measured to be 2.9 ounces of force (0.81 N). The sample failed by partial cohesive splitting of the nonwoven sheet and partial adhesive failure. A 1 inch by 1 inch (2.5 cm by 2.5 cm) sample was adhered to a vertical piece stainless steel and a 250 gram weight was hung from the sample. After 10,000 minutes, the sample remained suspended in spite of the static shear load.

Example 5

Solvent and Plasticizer Capsules on Nonwoven Mat

Pieces of nonwoven 1250 NC were cut to 12 inches by 18 inches (30.5 cm by 45.7 cm). A total of 3.8 g of capsules from Preparatory Example 1 were then dispersed on the surface of the mat. A pressurized spray gun was used to apply a coating of the latex from Preparatory Example 4, and the mat was dried for 10 minutes in an oven at 160° F. (71° C.). The average coating weight of dry adhesive was 37 grams per square meter. A sample of this film was cut to a size of 6 inches by 6 inches (15.2 cm by 15.2 cm) and subjected to a simulated shipping test in accordance with ASTM D4169. Under the simulated shipping conditions, the sample did not adhere to the adjacent sample. After the shipping simulation, the sample was pressed against steel with pressure by hand, and it was found to adhere to the substrate.

Example 6

Plasticizer Capsules on Nonwoven Mat

Pieces of nonwoven 1250 NC were cut to 12 inches by 18 inches (30.5 cm by 45.7 cm). A total of 1.1 g of capsules from Preparatory Example 2 was then dispersed on the surface of the mat. A pressurized spray gun was used to apply a coating of the latex from Preparatory Example 4, and the mat was dried for 10 minutes in an oven at 160° F. (71° C.). The average coating weight of dry adhesive was 29 grams per square meter. A sample of this film was cut to a size of 6 inches by 6 inches (15.2 cm by 15.2 cm) and subjected to a simulated shipping test. Under the simulated shipping conditions, the sample did not adhere to the adjacent sample. After the shipping simulation, the sample was pressed against steel with pressure by hand, and it was found to adhere to the substrate.

Comparative Example 1

Rayon without Capsules

A sheet of rayon nonwoven was cut to 20 inches by 14 inches (51 cm×36 cm). The sheet was then sprayed with latex from Preparatory Example 4 and dried in an oven at 160° F. (71° C.) for 10 minutes. The average coating weight of dry adhesive was 42 grams per square meter. A strip of that sample was cut into a strip of dimensions 1 inch by 6 inches (2.5 cm by 15.2 cm) and was placed with no added pressure against a stainless steel coupon that had been cleaned with heptanes. After resting in contact with the stainless steel for one minute, the sample was gently sheared on the surface and found to have developed no noticeable adhesion to the substrate. A 2.4 kg roller was then passed over the sample, and it was allowed to rest for an additional one minute. The sample was then peeled back in a 180° peel mode, and the average force to peel the sample was below the detectable limit.

Comparative Example 2

Nonwoven 1250 NC without Capsules

A sheet of nonwoven 1250 NC was cut to 20 inches by 14 inches (51 cm×36 cm). The sheet was then sprayed with latex from Preparatory Example 4 and dried in an oven at 160° F. (71° C.) for 10 minutes. The average coating weight of dry adhesive was 35 grams per square meter. A strip of that sample was cut into a strip of dimensions 1 inch by 6 inches (2.5 cm by 15.2 cm) and was placed with no added pressure against a stainless steel coupon that had been cleaned with heptanes. After resting in contact with the stainless steel for one minute, the sample was gently sheared on the surface and found to have developed no noticeable adhesion to the substrate. A 7.3 kg roller was then passed over the sample, and it was allowed to rest for an additional one minute. The sample was then peeled back in a 180° peel mode, and the average force to peel the sample was measured to be 0.8 ounces of force (0.22 N). The sample failed primarily by adhesive failure.

Comparative Example 3

Nonwoven 1535HT without Capsules

A sheet of nonwoven 1535HT was cut to 20 inches by 14 inches (51 cm×36 cm). The sheet was then sprayed with latex from Preparatory Example 4 and dried in an oven at 160° F. (71° C.) for 10 minutes. The average coating weight of dry adhesive was 33 grams per square meter. A strip of that sample was cut into a strip of dimensions 1 inch by 6 inches (2.5 cm by 15.2 cm) and was placed with no added pressure against a stainless steel coupon that had been cleaned with heptanes. After resting in contact with the stainless steel for one minute, the sample was gently sheared on the surface and found to have developed no noticeable adhesion to the substrate. A 7.3 kg roller was then passed over the sample, and it was allowed to rest for an additional one minute. The sample was then peeled back in a 180° peel mode, and the average force to peel the sample was measured to be 1.8 ounces of force (0.50 N). The sample failed primarily by adhesive failure.

Example 7

Knit Glass Fiber

A sheet of knit glass fiber was cut to 2 inches×2.5 inches (5 cm×6 cm) and was sprinkled with capsules from Preparatory Example 3 with an average of 10% area coverage. The release liner was removed from a piece of film from Preparatory Example 6 that was 2.5 inches×3 inches (6 cm×8 cm), and the film was placed on the glass surface and heated with a heat gun until the film softened and partially adhered to the glass. After cooling, the exposed surface of the adhesive film was placed down on a sheet of release liner. A 500 gram weight was placed on the glass in a 100° C. oven for 5 minutes to complete the lamination. A 1 inch×0.5 inch (2.5 cm×1.2 cm) piece was cut out. The sample was placed down on a glass slide and it initially showed repositionability. The back of the knit sheet was then rolled with 7.3 kg roller with five passes, and the sample showed noticeable adhesion to the glass. The glass was mounted vertically and the adhesive successfully held the knit sheet to the glass for more than 10,000 minutes.

Example 8

Foam

A sheet of open cell polyurethane foam was cut to 2 inches×2.5 inches (5 cm×6 cm) and was sprinkled with capsules from Preparatory Example 3 with an average of 10% area coverage. The release liner was removed from a piece of film from Preparatory Example 6 that was 2.5 inches×3 inches (6 cm×8 cm), and the film was placed on the foam surface and heated with a heat gun until the film softened and partially adhered to the foam. After cooling, the exposed surface of the adhesive film was placed down on a sheet of release liner. A 500 gram weight was placed on the foam in a 100° C. oven for 10 minutes to complete the lamination. A 1 inch×0.5 inch (2.5 cm×1.2 cm) piece was cut out. The sample was placed down on a glass slide and initially showed repositionability. The back of the foam was then rolled with a 7.3 kg roller with five passes, and the sample showed noticeable adhesion to the glass. The glass was mounted vertically and the adhesive successfully held the foam to the glass for more than 10,000 minutes.

Example 9

Foam with PSA Lamination

A sheet of open cell polyurethane foam was cut to 2 inches×2.5 inches (5 cm×6 cm). Super 77 adhesive was sprayed onto the foam surface. Super 77 adhesive was also sprayed onto the surface of a sheet of Preparatory Example 6. Microcapsules from Preparatory Example 3 were sprinkled onto the adhesive coated transfer adhesive with an average of 40% area coverage. One minute after spraying the surfaces, they were mated together. The release liner was placed face down on a piece of the open cell foam, and a 300 gram weight was placed on top of the stack for 24 hours at room temperature to complete the lamination. A 1 inch×0.5 inch (2.5 cm×1.2 cm) piece was cut out. The sample was placed down on a glass slide and showed repositionability.

The sample was then rolled with a 7.3 kg roller with five passes, and the sample showed noticeable adhesion to the glass. The glass was mounted vertically and the adhesive successfully held the foam to the glass for more than 10,000 minutes.

Example 10

Nonwoven with Solvent-Based PSA

Microcapsules from Preparatory Example 3 were placed on a piece of nonwoven 1250NC having dimensions of 2 inches×2.5 inches (5 cm×6 cm) with an area coverage of 14%. A portion of the solution from Preparatory Example 5 was placed on a sheet of release liner and drawn under a knife coater with a gap of 0.008" (0.20 mm) The film was then dried in a 70° C. oven for 10 minutes to produce an acrylic sheet with a thickness of 0.002 inch (0.05 mm) and a coating weight of 39 grams per square meter. Dynamic mechanical analysis on a portion of this film showed a glass transition temperature of 84° C.

A piece of this film was then placed over the microcapsules on the surface of the nonwoven. The film was heated with a heat gun until it softened, and the release liner was then removed. The film was heated further until it had bonded to the nonwoven and microcapsules. A 1 inch×0.5 inch (2.5 cm×1.2 cm) piece was cut out. The sample was placed down on glass slide and showed repositionability. The sample was then rolled with a 2.4 kg roller with five passes, and the sample showed noticeable adhesion to the glass. The glass was mounted vertically and the adhesive successfully held the nonwoven to the glass for more than 10,000 minutes.

Example 11

Protruding Capsules

Microcapsules from Preparatory Example 3 were placed on PET liner. Latex from Preparatory Example 4 (3 mL) was placed on the capsules using a pipette. The liner was then drawn under a coating knife with a gap nominally set at 0.006 inch (0.15 mm) The resulting film was dried in a 90° C. oven for 20 minutes. The resulting film had a 0.004 inch to 0.005 inch (0.010 mm to 0.013 mm) thickness with noticeably protruding microcapsules. A 1 inch (2.5 cm) strip of this material was placed face down on a piece of glass and passed once with a 2.4 kg roller. The microcapsules visibly broke and released liquid as the roller passed over the sample. The strip was peeled away from the glass, and soft, oily residue was present where the microcapsules had been broken.

Comparative Example 4

Non-Protruding Capsules

A similar sample to Example 11 was prepared by placing microcapsules from Preparatory Example 3 on a PET liner with 3 mL of latex from Preparatory Example 4 and drawing it through a knife coater with a gap that was nominally 0.006 inch (0.15 mm) After drying in a 90° C. oven for 20 minutes, additional latex was added to the sample and it was again drawn under the knife coater with the same gap and dried for 10 minutes in a 90° C. oven. The gap of the knife coater was increased, and the sample was coated and dried three additional times. Then, the gap was increase yet again, and the sample was coated once more and dried. The resulting film was 0.019 inch to 0.022 inch (0.48 mm to 0.56 mm) thick, and the microcapsules were fully embedded within the thickness of the film. A 1 inch (2.5 cm) strip of this material was placed face down on a piece of glass and passed once with a 2.4 kg roller. The microcapsules did not appear to break, and the strip was easily peeled away from the glass with no significant increase in adhesion. The same sample was then rolled with a 7.3 kg roller with the same results. Then, the corner of a rectangular plate of stainless steel 0.05 inch (0.13 mm) thick was used to rub the locations where the microcapsules were visible. The corner of the plate of stainless steel noticeably pressed into the film, and the microcapsules visibly broke and released liquid. The strip was peeled away from the glass, and a significant increase in adhesion and softening of the film were observed. Accordingly, microcapsules that protrude from the surface of a film can be broken with less force than a comparable system with microcapsules that are embedded entirely within the film.

While the specification has described in detail certain exemplary embodiments, it will be appreciated that those skilled in the art, upon attaining an understanding of the foregoing, may readily conceive of alterations to, variations of, and equivalents to these embodiments. Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. An article comprising:
   a substrate having a first major surface, the substrate comprising a nonwoven material, a woven material, or a foam, wherein the substrate has a compressive strength of from 50 Pascals (Pa) to 20,000 Pa at 10% compression; and
   a plurality of microcapsules comprising an outer surface and a plasticizer encapsulated in the microcapsules, the plurality of microcapsules attached to the first major surface of the substrate with a polymeric material layer, wherein a ratio of an average diameter of the plurality of microcapsules to an average coating thickness of the polymeric material layer on the substrate is 1.3 to 10;
   wherein the plurality of microcapsules further comprises a coating of the polymeric material on at least a portion of the outer surface of each microcapsule located above the upper surface of the polymeric material layer on the surface of the substrate; and
   wherein the polymeric material has a glass transition temperature (T g) greater than 0° C.

2. The article of claim 1, wherein the substrate comprises glass fibers, silica fibers, basalt fibers, polyamide fibers, polyolefin fibers, acrylic fibers, polyester fibers, cellulose fibers, wool fibers, rayon fibers, carbon fibers, or combinations thereof.

3. The article of claim 1, wherein the substrate comprises a polymeric foam comprising a polyolefin, a polyurethane, a poly(meth)acrylate, or neoprene.

4. The article of claim 1, wherein the substrate comprises a sponge, a cushion, or insulation.

5. The article of claim 1, wherein the plurality of microcapsules has an average microcapsule diameter of from 50 micrometers to 500 micrometers.

6. The article of claim 1, wherein the plurality of microcapsules comprises shells comprising polyurea formaldehyde, cellulosic materials, copolymers of isobornyl methacrylate with (meth)acrylic acid, nylon, polyurethane, polyurea, polycarbonate, or polymers formed from urea, formaldehyde and melamine monomers.

7. The article of claim 1, wherein the plasticizer comprises a phosphate ester, a benzoyl functionalized polyether, a polyalkylene oxide, an alkyl or aryl functionalized polyalkylene oxide, a monomethyl ether of polyethylene oxide, a monomeric adipate, a polymeric adipate, a citrate, a glutarate, a trimellitate, a sebacate, a polyester, or a combination thereof.

8. The article of claim 1, wherein the plurality of microcapsules further comprises a solvent encapsulated in the microcapsules comprising a hydrocarbon, an aromatic hydrocarbon, a halogenated hydrocarbon, a halogenated aromatic hydrocarbon, a substituted aromatic solvent, a ketone, an ester, an amide, a nitrile, a sulfoxide, or combinations thereof.

9. The article of claim 1, wherein a ratio of the average diameter of the plurality of microcapsules to the average coating thickness of the polymeric material on the substrate is 2 to 6.

10. The article of claim 1, wherein the substrate comprises an average of from 4% to 25% area coverage on the first major surface by the plurality of microcapsules.

11. The article of claim 1, wherein the substrate comprises an average coating weight of dry polymeric material of from 10 to 100 grams per square meter of the covered area of the substrate.

12. The article of claim 1, wherein the substrate comprises a density of from 0.01 grams per milliliter (g/mL) to 0.75 g/mL.

13. A method of making an article comprising:
providing a substrate having a first major surface, the substrate comprising a nonwoven material, a woven material, or a foam, wherein the substrate has a compressive strength of from 50 Pa to 20,000 Pa at 10% compression;
providing a plurality of microcapsules comprising an outer surface and a plasticizer encapsulated in the microcapsules; and
attaching the plurality of microcapsules to the first major surface of the substrate with a polymeric material layer, thereby forming a polymeric matrix attached to the first major surface of the substrate;
wherein a ratio of an average diameter of the plurality of microcapsules to an average coating thickness of the polymeric material layer on the substrate is 1.3 to 10;
wherein the plurality of microcapsules further comprises a coating of the polymeric material on at least a portion of the outer surface of each microcapsule located above the upper surface of the polymeric material layer on the surface of the substrate; and
wherein the polymeric material comprises a glass transition temperature (Tg) greater than 0° C.

14. The method of claim 13, wherein the attaching comprises depositing the plurality of microcapsules on the first major surface of the substrate and coating the polymeric material onto a majority of the plurality of microcapsules and at least a portion of the first major surface of the substrate.

15. The method of claim 13, further comprising curing the polymeric material.

16. The method of claim 13, wherein the substrate comprises glass fibers, polyamide fibers, polyolefin fibers, acrylic fibers, polyester fibers, cellulose fibers, wool fibers, rayon fibers, carbon fibers, or combinations thereof.

17. The method of claim 13, wherein the plurality of microcapsules further comprises a solvent encapsulated in the microcapsules.

18. The article of claim 1, wherein the plurality of microcapsules are completely coated by the polymeric material on the outer surface of each microcapsule.

19. The article of claim 1, wherein the plurality of microcapsules comprises a coating of the polymeric material on the top of the outer surface of each microcapsule.

* * * * *

UNITED STATES PATENT AND TRADEMARK OFFICE
CERTIFICATE OF CORRECTION

PATENT NO. : 11,306,431 B2
APPLICATION NO. : 15/100655
DATED : April 19, 2022
INVENTOR(S) : Joseph Douglas Rule It is certified that error appears in the above-identified patent and that said Letters Patent is hereby corrected as shown below:

In the Claims

Column 26
Line 52, In Claim 1, delete "(T g)" and insert -- ($T_g$) --, therefor.

Column 28
Line 16, In Claim 13, delete "(Tg)" and insert -- ($T_g$) --, therefor.

Signed and Sealed this
Thirteenth Day of December, 2022

Katherine Kelly Vidal
*Director of the United States Patent and Trademark Office*